(12) United States Patent
Gomadam et al.

(10) Patent No.: US 8,750,404 B2
(45) Date of Patent: Jun. 10, 2014

(54) CODEBOOK SUBSAMPLING FOR PUCCH FEEDBACK

(75) Inventors: Krishna Srikanth Gomadam, Sunnyvale, CA (US); Adoram Erell, Herzliya (IL)

(73) Assignee: Marvell World Trade Ltd., St. Michael (BB)

( * ) Notice: Subject to any disclaimer, the term of this patent is extended or adjusted under 35 U.S.C. 154(b) by 0 days.

(21) Appl. No.: 13/252,218

(22) Filed: Oct. 4, 2011

(65) Prior Publication Data
US 2012/0087425 A1 Apr. 12, 2012

Related U.S. Application Data

(60) Provisional application No. 61/390,511, filed on Oct. 6, 2010, provisional application No. 61/392,431, filed on Oct. 12, 2010.

(51) Int. Cl.
*H04L 1/02* (2006.01)

(52) U.S. Cl.
USPC .......................................... 375/267; 455/132

(58) Field of Classification Search
USPC .......................................................... 375/267
See application file for complete search history.

(56) References Cited

U.S. PATENT DOCUMENTS

| | | | |
|---|---|---|---|
| 5,231,629 A | 7/1993 | Kotzin et al. | |
| 5,263,160 A | 11/1993 | Porter, Jr. et al. | |
| 5,349,567 A | 9/1994 | Reed | |
| 5,940,439 A | 8/1999 | Kleider et al. | |
| 6,466,904 B1 * | 10/2002 | Gao et al. | 704/220 |
| 6,512,750 B1 | 1/2003 | Palenius | |
| 6,757,319 B1 | 6/2004 | Parsa et al. | |
| 6,865,237 B1 | 3/2005 | Boariu et al. | |
| 7,839,944 B2 | 11/2010 | Lee et al. | |
| 7,941,186 B2 | 5/2011 | Cho et al. | |
| 8,036,286 B2 | 10/2011 | Lee et al. | |

(Continued)

FOREIGN PATENT DOCUMENTS

| | | |
|---|---|---|
| EP | 2182754 A1 | 5/2010 |
| JP | 2008236222 A | 2/2008 |

(Continued)

OTHER PUBLICATIONS

Huang et al., "A Limited Feedback Precoding System with Hierarchical Codebook and Linear Receiver", IEEE Transactions on Wireless Communications, vol. 7, No. 12, pp. 4843-4848, Dec. 2008.

(Continued)

*Primary Examiner* — Santiago Garcia

(57) ABSTRACT

A method in a mobile communication terminal includes holding a definition of a sub-sampled codebook identifying precoding matrices to be used for providing precoding feedback by the terminal The precoding matrices in the sub-sampled codebook are selected from a master codebook that is made-up of a long-term sub-codebook and a short-term sub-codebook. The definition defines a first subset of the long-term sub-codebook and a second subset of the short-term sub-codebook. A Multiple-Input Multiple-Output (MIMO) signal is received in the terminal via multiple receive antennas. Based on the received MIMO signal, a precoding matrix is selected from the sub-sampled codebook for precoding subsequent MIMO signals transmitted to the terminal. The precoding feedback indicating the selected precoding matrix is calculated.

19 Claims, 2 Drawing Sheets

(56) References Cited

U.S. PATENT DOCUMENTS

| | | |
|---|---|---|
| 8,068,555 B2 | 11/2011 | Jongren et al. |
| 8,098,750 B2 | 1/2012 | Mueck et al. |
| 8,179,775 B2 | 5/2012 | Chen et al. |
| 8,325,844 B2 | 12/2012 | Walton et al. |
| 2002/0001333 A1 | 1/2002 | Glasheen et al. |
| 2003/0035491 A1 | 2/2003 | Walton et al. |
| 2005/0108281 A1 | 5/2005 | Kim et al. |
| 2005/0141630 A1 | 6/2005 | Catreaux et al. |
| 2005/0157810 A1 | 7/2005 | Raleigh et al. |
| 2005/0237920 A1 | 10/2005 | Howard et al. |
| 2005/0250544 A1 | 11/2005 | Grant et al. |
| 2005/0276317 A1 | 12/2005 | Jeong et al. |
| 2006/0014554 A1 | 1/2006 | Gerlach |
| 2006/0056538 A1 | 3/2006 | Nam et al. |
| 2006/0093060 A1 | 5/2006 | Jung et al. |
| 2006/0114858 A1 | 6/2006 | Walton et al. |
| 2006/0153112 A1 | 7/2006 | Lim et al. |
| 2006/0203777 A1 | 9/2006 | Kim et al. |
| 2006/0233131 A1 | 10/2006 | Gore et al. |
| 2006/0276212 A1 | 12/2006 | Sampath et al. |
| 2007/0058746 A1 | 3/2007 | Gueguen |
| 2007/0076810 A1 | 4/2007 | Herrera et al. |
| 2007/0099578 A1 | 5/2007 | Adeney et al. |
| 2007/0149229 A1 | 6/2007 | Frederiksen et al. |
| 2007/0153731 A1 | 7/2007 | Fine |
| 2007/0160162 A1 | 7/2007 | Kim et al. |
| 2007/0165738 A1 | 7/2007 | Barriac et al. |
| 2007/0217540 A1 | 9/2007 | Onggosanusi et al. |
| 2007/0223422 A1 | 9/2007 | Kim et al. |
| 2007/0223423 A1 | 9/2007 | Kim et al. |
| 2007/0230373 A1 | 10/2007 | Li et al. |
| 2007/0248068 A1 | 10/2007 | Onggosanusi et al. |
| 2007/0253386 A1 | 11/2007 | Li et al. |
| 2007/0270170 A1 | 11/2007 | Yoon et al. |
| 2008/0013610 A1 | 1/2008 | Varadarajan et al. |
| 2008/0025336 A1 | 1/2008 | Cho et al. |
| 2008/0039067 A1 | 2/2008 | Jin et al. |
| 2008/0043702 A1 | 2/2008 | Moon et al. |
| 2008/0049709 A1 | 2/2008 | Pan et al. |
| 2008/0080364 A1 | 4/2008 | Barak et al. |
| 2008/0080632 A1 | 4/2008 | Kim et al. |
| 2008/0080634 A1 | 4/2008 | Kotecha et al. |
| 2008/0080635 A1 | 4/2008 | Hugl et al. |
| 2008/0080637 A1 | 4/2008 | Khan et al. |
| 2008/0095258 A1* | 4/2008 | She et al. .................. 375/262 |
| 2008/0101407 A1 | 5/2008 | Khan et al. |
| 2008/0108310 A1 | 5/2008 | Tong et al. |
| 2008/0112351 A1 | 5/2008 | Surineni et al. |
| 2008/0130778 A1 | 6/2008 | Xia et al. |
| 2008/0144522 A1 | 6/2008 | Chang et al. |
| 2008/0165875 A1 | 7/2008 | Mundarath et al. |
| 2008/0186212 A1 | 8/2008 | Clerckx et al. |
| 2008/0192852 A1 | 8/2008 | Kent et al. |
| 2008/0198776 A1 | 8/2008 | Seo |
| 2008/0232494 A1 | 9/2008 | Pan et al. |
| 2008/0232503 A1 | 9/2008 | Kim |
| 2008/0247364 A1 | 10/2008 | Kim et al. |
| 2008/0247475 A1 | 10/2008 | Kim et al. |
| 2008/0268855 A1 | 10/2008 | Hanuni et al. |
| 2008/0268887 A1 | 10/2008 | Jansen et al. |
| 2008/0285433 A1 | 11/2008 | Akita et al. |
| 2008/0292013 A1 | 11/2008 | Varadarajan et al. |
| 2008/0298452 A1 | 12/2008 | Sampath et al. |
| 2008/0298482 A1 | 12/2008 | Rensburg et al. |
| 2008/0318606 A1 | 12/2008 | Tsutsui et al. |
| 2009/0011761 A1 | 1/2009 | Han et al. |
| 2009/0016263 A1 | 1/2009 | Kishigami et al. |
| 2009/0046800 A1 | 2/2009 | Xu et al. |
| 2009/0098876 A1 | 4/2009 | Khan et al. |
| 2009/0110114 A1 | 4/2009 | Onggosanusi et al. |
| 2009/0122857 A1 | 5/2009 | Li et al. |
| 2009/0161605 A1 | 6/2009 | Shen et al. |
| 2009/0180561 A1 | 7/2009 | Kim et al. |
| 2009/0252332 A1 | 10/2009 | Chang et al. |
| 2009/0252333 A1 | 10/2009 | Chang et al. |
| 2009/0282310 A1 | 11/2009 | Seok et al. |
| 2009/0296844 A1 | 12/2009 | Ihm et al. |
| 2009/0304109 A1 | 12/2009 | Kotecha |
| 2010/0031117 A1 | 2/2010 | Lee et al. |
| 2010/0034308 A1 | 2/2010 | Kim et al. |
| 2010/0035627 A1 | 2/2010 | Hou et al. |
| 2010/0054354 A1 | 3/2010 | Tosato |
| 2010/0056170 A1 | 3/2010 | Lindoff et al. |
| 2010/0061477 A1 | 3/2010 | Lee et al. |
| 2010/0067512 A1 | 3/2010 | Nam et al. |
| 2010/0069106 A1 | 3/2010 | Swarts et al. |
| 2010/0074301 A1 | 3/2010 | Howard et al. |
| 2010/0103834 A1 | 4/2010 | Gorokhov et al. |
| 2010/0158151 A1 | 6/2010 | Krauss et al. |
| 2010/0172424 A1 | 7/2010 | Perets et al. |
| 2010/0172430 A1* | 7/2010 | Melzer et al. .................. 375/267 |
| 2010/0173639 A1 | 7/2010 | Li et al. |
| 2010/0215112 A1 | 8/2010 | Tsai et al. |
| 2010/0220800 A1 | 9/2010 | Erell et al. |
| 2010/0238984 A1 | 9/2010 | Sayana et al. |
| 2010/0254474 A1 | 10/2010 | Gomadam et al. |
| 2010/0260234 A1 | 10/2010 | Thomas et al. |
| 2010/0260243 A1 | 10/2010 | Ihm et al. |
| 2010/0267341 A1 | 10/2010 | Bergel et al. |
| 2010/0271968 A1 | 10/2010 | Liu et al. |
| 2010/0272014 A1 | 10/2010 | Orlik et al. |
| 2010/0272032 A1 | 10/2010 | Sayana et al. |
| 2010/0273514 A1 | 10/2010 | Koo et al. |
| 2010/0278278 A1* | 11/2010 | Lee et al. ...................... 375/267 |
| 2010/0284484 A1 | 11/2010 | Jongren et al. |
| 2010/0290548 A1 | 11/2010 | Hoshno et al. |
| 2010/0296603 A1 | 11/2010 | Lee et al. |
| 2011/0019631 A1 | 1/2011 | Kotecha et al. |
| 2011/0026413 A1 | 2/2011 | Swarts et al. |
| 2011/0034175 A1 | 2/2011 | Fong et al. |
| 2011/0058621 A1 | 3/2011 | Clerckx et al. |
| 2011/0064156 A1 | 3/2011 | Kim et al. |
| 2011/0077038 A1 | 3/2011 | Montojo et al. |
| 2011/0080969 A1 | 4/2011 | Jongren et al. |
| 2011/0085610 A1 | 4/2011 | Zhuang et al. |
| 2011/0096704 A1 | 4/2011 | Erell et al. |
| 2011/0103534 A1 | 5/2011 | Axmon et al. |
| 2011/0110403 A1 | 5/2011 | Jongren |
| 2011/0110450 A1 | 5/2011 | Gomadam et al. |
| 2011/0150052 A1 | 6/2011 | Erell et al. |
| 2011/0164701 A1 | 7/2011 | Nikopourdeilami et al. |
| 2011/0170435 A1 | 7/2011 | Kim et al. |
| 2011/0170638 A1 | 7/2011 | Yuan et al. |
| 2011/0188393 A1 | 8/2011 | Mallik et al. |
| 2011/0194594 A1* | 8/2011 | Noh et al. ...................... 375/224 |
| 2011/0194638 A1 | 8/2011 | Erell et al. |
| 2011/0194644 A1 | 8/2011 | Liu et al. |
| 2011/0205930 A1 | 8/2011 | Rahman et al. |
| 2011/0216846 A1 | 9/2011 | Lee et al. |
| 2011/0235608 A1 | 9/2011 | Koo et al. |
| 2011/0250919 A1 | 10/2011 | Barbieri et al. |
| 2011/0261775 A1 | 10/2011 | Kim et al. |
| 2011/0268204 A1 | 11/2011 | Choi et al. |
| 2011/0274188 A1 | 11/2011 | Sayana et al. |
| 2011/0306341 A1 | 12/2011 | Klein et al. |
| 2012/0002568 A1 | 1/2012 | Tiirola et al. |
| 2012/0020433 A1 | 1/2012 | Bhattad et al. |
| 2012/0033592 A1 | 2/2012 | Kim et al. |
| 2012/0033630 A1 | 2/2012 | Chung et al. |
| 2012/0039369 A1 | 2/2012 | Choi et al. |
| 2012/0058735 A1 | 3/2012 | Vermani et al. |
| 2012/0063336 A1 | 3/2012 | Shany et al. |
| 2012/0069887 A1 | 3/2012 | Park et al. |
| 2012/0069917 A1* | 3/2012 | Liu et al. ...................... 375/259 |
| 2012/0076028 A1 | 3/2012 | Ko et al. |
| 2012/0087435 A1 | 4/2012 | Gomadam et al. |
| 2012/0134434 A1 | 5/2012 | Chen et al. |
| 2012/0219042 A1* | 8/2012 | Onggosanusi et al. ........ 375/219 |
| 2012/0219083 A1* | 8/2012 | Tong et al. ...................... 375/267 |
| 2012/0257664 A1 | 10/2012 | Yue et al. |
| 2012/0275376 A1 | 11/2012 | Sampath et al. |
| 2012/0275386 A1 | 11/2012 | Frenne et al. |
| 2012/0281620 A1 | 11/2012 | Sampath et al. |
| 2013/0028068 A1* | 1/2013 | Park et al. ...................... 370/203 |

(56) References Cited

U.S. PATENT DOCUMENTS

| | | | |
|---|---|---|---|
| 2013/0028344 A1* | 1/2013 | Chen et al. | 375/267 |
| 2013/0039284 A1* | 2/2013 | Marinier et al. | 370/329 |
| 2013/0051256 A1 | 2/2013 | Ong et al. | |
| 2013/0107916 A1 | 5/2013 | Liu et al. | |
| 2013/0176991 A1 | 7/2013 | Yi | |
| 2013/0182786 A1 | 7/2013 | Frenne et al. | |

FOREIGN PATENT DOCUMENTS

| | | |
|---|---|---|
| JP | 2008054125 A | 3/2008 |
| JP | 2008118411 A | 5/2008 |
| JP | 2008147792 A | 6/2008 |
| WO | 2005117283 A2 | 12/2005 |
| WO | 2007133564 A3 | 11/2007 |
| WO | 2008009157 A1 | 1/2008 |
| WO | 2008133582 A2 | 11/2008 |
| WO | 2009116471 A1 | 9/2009 |
| WO | 2010013950 A2 | 2/2010 |
| WO | 2011147692 A1 | 12/2011 |

OTHER PUBLICATIONS

Kim et al., "Efficient Feedback via Subs pace-Based Channel Quantization for Distributed Cooperative Antenna Systems with Temporarily Correlated Channels", EURASIP Journal on Advances in Signal Processing, vol. 2008, Nov. 23, 2007.
NTT DOCOMO, "Views on Codebook Design for Downlink 8Tx MIMO", 3GPP TSG RAN WG1 Meeting #59bis, Valencia, Spain, Jan. 18-22, 2010.
Alcatel Lucent, "Overview of Hierarchical Codebook Approach", 3GPP TSG RAN WG1 Meeting #59bis, Valencia, Spain, Jan. 18-22, 2009.
JP Patent Application # 2011-024295 Official Action dated Sep. 11, 2012.
Samsung, "Precoding for polarized 4Tx configurations", 3GPP TSG RAN WG1 Meeting #48bis, St Julian's, Malta, Mar. 26-30, 2007.
Mondal et al., "Rank-Independent Codebook Design from a Quaternary Alphabet", Proceedings of 41st Asilomar Conference on Signals, Systems and Computers (ACSSC), pp. 297-301, Nov. 7, 2007.
JP Patent Application # 2011-544111 Official Action dated Nov. 6, 2012.
3rd Generation Partnership Project; Technical Specification Group Radio Access Network; Requirements for Further Advancements for Evolved Universal Terrestrial Radio Access (E-UTRA) (LTE-Advanced) (Release 8), 3GPP TR 36.913 V8.0.1, Sophia Antipolis, France, Mar. 2009.
Motorola, "Uplink Power Control for E-UTRA", 3GPP TSG RAN1 #48, St. Louis, USA, Feb. 12-16, 2007.
Nortel, "On the discussions of carrier aggregations", 3GPP TSG-RAN Working Group 1 Meeting #55, Prague, Czech Republic, Nov. 10-14, 2008.
NTT DOCOMO, Inc., "Updated Views on Support of Wider Bandwidth in LTE-Advanced", 3GPP TSG RAN WG1 Meeting #54bis, Prague, Czech Republic, Sep. 29-Oct. 3, 2008.
3rd Generation Partnership Project; Technical Specification Group Radio Access Network; User Equipment (UE) radio transmission and reception (FDD) (Release 8), 3GPP TS 25.101 V8.5.1, Sophia Antipolis, France, Jan. 2009.
Lucent Technologies, "Link Error Prediction for E-DCH", TSG-RAN WG1#35, Lisbon, Portugal, Nov. 17-21, 2003.
Ericsson, "On Channel Reciprocity for Enhanced DL Multi-Antenna Transmission", TSG-RAN WG1 #59, Jeju, Korea, Nov. 9-13, 2009.
Ericsson, "System-level evaluation of OFDM—further considerations", TSG-RAN WG1 #35, Lisbon, Portugal, Nov. 17-21, 2003.
Nortel Networks, "OFDM Exponential Effective SIR Mapping Validation, EESM Simulation Results for System-Level Performance Evaluations, and Text Proposal for Section A.4.5 of TR 25.892", 3GPP TSG-RAN-1/TSG-RAN-4 Ad Hoc, Espoo, Finland, Jan. 27-30, 2004.

Park et al., "Efficient Coherent Neighbour Cell Search for Synchronous 3GPP LTE System", Electronic Letters, vol. 44, No. 21, Oct. 2008.
Motorola, "Low-Overhead Feedback of Spatial Covariance Matrix", TSG-RAN WG1 #59, Jeju, Korea, Nov. 9-13, 2009.
Motorola, "Use of UL Covariance for Downlink MIMO in FDD", TSG-RAN WG1 #59, Jeju, Korea, Nov. 9-13, 2009.
3rd Generation Partnership Project, "Technical Specification Group Radio Access Network; Evolved Universal Terrestrial Radio Access (E-UTRA); Multiplexing and channel coding (Release 8)", 3GPP TS 36.212 V8.6.0 (Mar. 2009), Sophia Antipolis, France.
Samsung, "Discussion on Enhanced DL Beamforming", 3GPP TSG RAN WG1 Meeting #56bis, Seoul, Korea, Mar. 23-27, 2009.
Alcatel-Lucent Shanghai Bell, "Correlation-based Explicit Feedback", 3GPP TSG RAN WG1 Meeting # 59bis, Valencia, Spain, Jan. 18-22, 2010.
International Application PCT/IB2010/051088 Search Report dated Sep. 21, 2010.
International Application PCT/IB2010/053272 Search report dated Dec. 27, 2010.
Motorola, "Codebook for 8Tx DL SU-MIMO for LTE-1", TSG-RAN WG1 #59, Jeju, Korea, Nov. 9-13, 2009.
Marvell Semiconductor, "Precoding Options for 8Tx Antennas in LTE-A DL", 3GPP TSG RAN WG1 Meeting #55bis, Ljubljana, Slovenia, Jan. 12-16, 2009.
U.S. Appl. No. 13/052,075, filed Mar. 20, 2011.
Marvell, "Codebook Adaptation for ULA Antenna", 3GPP TSG RAN WG1 Meeting #60, San Francisco, USA, Feb. 22-22, 2010.
U.S. Appl. No. 61/321,386, filed Apr. 6, 2010.
U.S. Appl. No. 61/294,737, filed Mar. 13, 2010.
U.S. Appl. No. 12/902,168, filed Oct. 12, 2010.
U.S. Appl. No. 12/903,237, filed Oct. 13, 2010.
Alcatel-Lucent, "Fractional Power Control Using Pilot Power Ration Measurements for the E-UTRA Uplink", 3GPP TSG RAN WG1 # 48, St. Louis, USA, Feb. 12-16, 2007.
Alcatel-Lucent Shanghai Bell, "Considerations on spatial covariance aided implicit feedback for MU-MIMO", 3GPP TSG RAN WG1 Meeting #59, Jeju, Korea, Nov. 9-13, 2009.
Catt, "Feedback enhancements for LTE-A downlink transmission", 3GPP TSG RAN WG1 Meeting #59, Jeju, Korea, Nov. 9-13, 2009.
U.S. Appl. No. 13/346,737, filed Jan. 10, 2012.
U.S. Appl. No. 13/433,293, filed Mar. 29, 2012.
Ericsson et al., "Way Forward for Rel-10 Feedback Framework", 3GPP TSG RAN WG1 Meeting #60, San Francisco, USA, Feb. 22-22, 2010.
Huawei, "Adaptive Feedback: A New Perspective of the Adaptive Codebook", 3GPP TSG RAN WG1 meeting #58, Shenzhen, China, Aug. 24-28, 2009.
Motorola, "Interference Mitigation via Power Control and FSM Resource Allocation and UE Alignment for E-UTRA Uplink and TP", 3GPPP TSG RAN1 # 44, Denver, USA, Feb. 13-17, 2006.
Marvell, "Successive Codebook Refinement: Further details and evaluation", 3GPP TSG-RAN WG1 #60bis, Beijing, Apr. 12-16, 2010.
Marvell Semiconductor, "Feedback Methods for Exploiting Channel Correlation in LTE-A DL", 3GPP TSG RAN WG1 Meeting #57, Los Angeles, USA, Jun. 29-Jul. 3, 2009.
Marvell Semiconductor, "Spatial Correlation based transmission schemes for LTE-A DL", 3GPP TSG RAN WG1 meeting #58, Shenzhen, China, Aug. 24-28, 2009.
Samsung, "Comparisons and performance evaluation of differential feedback proposals for Rel 8 PMI enhancements", 3GPP TSG RAN WG1 Meeting #59bis, Valencia, Spain, Jan. 18-22, 2010.
Samsung, "Codebook Design for 8 Tx Transmission in LTE-A", 3GPP TSG RAN WG1 Meeting #56, Athens, Greece, Feb. 9-13, 2009.
International Application PCT/IB2009/052987 Search Report dated Jan. 27, 2010.
Rapporteur (NTT DOCOMO), "Text Proposal for RAN1 TR on LTE Advanced", 3GPP TSG RAN WG1 Meeting #53bis, Warsaw, Poland, Jun. 30-Jul. 4, 2008.

(56) References Cited

OTHER PUBLICATIONS

Ericsson, "Design and Evaluation of Precoder Codebooks for CSI Feedback", 3GPP TSG RAN WG1 61bis, Dresden, Germany, Jun. 28-Jul. 2, 2010.
Samsung, "Coordinated Multi-Point Operation for LTE", TSG RAN WG1 50, Istanbul, Turkey, Dec. 7-10, 2010.
Alcatel-Lucent et al., "Way Forward on CSI Feedback for Rel.10 DL MIMO", 3GPP TSG RAN WG1 62, Madrid, Spain, Aug. 23-27, 2010.
Alcatel-Lucent et al., "Further Analysis of Companion Feedback Performance and Feedback Signaling Overhead Reduction", 3GPP TSG RAN WG1 62, Madrid, Spain, Aug. 23-27, 2010.
Alcatel-Lucent et al., "Way Forward on CQI/PMI Reporting Enhancement on PUSCH 3-1 for 2, 4 and 8 TX", 3GPP TSG RAN WG1 62bis, Xian, China, Oct. 11-15, 2010.
Marvell, "CQI Enhancement for 4Tx", 3GPP TSG-RAN WG1 #62bis, Xian, Oct. 11-15, 2010.
NEC Group, "Enhancing MU-MIMO CQI," 3GPP TSG-RAN WGI #62bis, Xian, China, Oct. 11-15, 2010.
LG Electronics, "Further Discussion on CQI/PMI Enhancement", 3GPP TSG RAN # 62BIS, Xian, China, Oct. 11-15, 2010.
Marvell, "Two-Component PMI Codebook for 8TX", 3GPP TSG RAN # 62 Meeting, Madrid, Spain, Aug. 23-27, 2010.
Marvell, "Details of PUCCH 1-1 for 8Tx", 3GPP TSG RAN # 63, Jacksonville, USA, Nov. 15-19, 2010.
Alcatel-Lucent et al., "Way Forward on Enhancement for Rel.10 DL MIMO", 3GPP TSG RAN WG1 62, Madrid, Spain, Aug. 23-27, 2010.
Samsung, "Preliminary CoMP JP Results for Homogeneous Networks", 3GPP TSG RAN # 64, Taipei, Taiwan, Feb. 21-25, 2011.
Huawei, "Performance Evaluation of Phase 1: Downlink Homogeneous Network with High Tx Power RRHs", 3GPP TSG RAN # 64, Taipei, Taiwan, Feb. 21-25, 2011.
ZTE, "Initial CoMP Evaluation for Homogeneous Network with High Tx Power RRHs", 3GPP TSG RAN # 64, Taipei, Taiwan, Feb. 21-25, 2011.
U.S. Appl. No. 12/723,647 Official Action dated Feb. 6, 2012.
U.S. Appl. No. 12/723,647 Official Action dated Apr. 27, 2012.
U.S. Appl. No. 12/652,044 Official Action dated Feb. 7, 2012.
Alcatel-Lucent et al., "Way Forward on 8Tx Codebook for Rel.10 DL MIMO", 3GPP TSG RAN WG1 62, Madrid, Spain, Aug. 23-27, 2010.
U.S. Appl. No. 12/477,152 Official Action dated Jun. 26, 2012.
U.S. Appl. No. 12/723,645 Official Action dated Aug. 31, 2012.
U.S. Appl. No. 12/723,647 Official Action dated Aug. 17, 2012.
U.S. Appl. No. 12/652,044 Official Action dated Jun. 29, 2012.
U.S. Appl. No. 12/838,509 Official Action dated Jun. 21, 2012.
U.S. Appl. No. 13/023,555 Official Action dated Sep. 14, 2012.
International Application PCT/IB2012/051511 Search Report dated Aug. 31, 2012.
U.S. Appl. No. 13/610,904, filed Sep. 12, 2012.
3GPP TR 36.819 "3rd Generation Partnership Project; Technical Specification Group Radio Access Network; Coordinated Multi-Point Operation for LTE Physical Layer Aspects (release 11)", version 11.0.0, Sep. 2011.
International Application No. PCT/IB2009/052726 Search Report dated Jan. 28, 2010.
International Application No. PCT/IB2010/050014 Search Report dated Jun. 15, 2010.
International Application No. PCT/IB2010/050797 Search Report dated Jul. 15, 2010.
International Application No. PCT/IB2010/051089 Search Report dated Jul. 9, 2010.
Ericsson, "Carrier Aggregation in LTE-Advanced", TSG-RAN WG1 #53bis, Warsaw, Poland, Jun. 30-Jul. 4, 2008.
Viswanath et al., "Opportunistic Beamforming Using Dumb Antennas," IEEE Transactions on Information Theory, vol. 48, No. 6, pp. 1277-1294, Jun. 2002.

Sharif et al., "On the Capacity of MIMO Broadcast Channels with Partial Side Information," IEEE Transactions on Information Theory, vol. 51, No. 2, pp. 506-522, Feb. 2005.
Texas Instruments, "Codebook Design for E-UTRA MIMO Precoding", 3GPP TSG RAN WG1 46bis, Seoul, Korea, Oct. 9-13, 2006.
Samsung, "Codebook based Precoding for 8 Tx Transmission in LTE-A", 3GPP TSG RAN WG1 Meeting #55, Prague, Czech Republic, Nov. 10-14, 2008.
Qualcomm Europe, "Link Analysis for 4×2 and 4×4 Precoder Set Decision", 3GPP TSG-RAN WG1 #48bis, St. Julian's, Malta, Mar. 26-30, 2007.
3GPP TR 25.892 V6.0.0, "3rd Generation Partnership Project; Technical Specification Group Radio Access Network; Feasibility Study for Orthogonal Frequency Division Multiplexing (OFDM) for UTRAN enhancement (Release 6)", Sophia Antipolis, France, Jun. 2004.
Samsung, "CQI reporting for MU-MIMO", 3GPP TSG RAN WG1 Meeting #54, Jeju, Korea, Aug. 18-22, 2008.
Motorola, "Some Results on DL-MIMO Enhancements for LTE-A", TSG-RAN WG1 #55bis, Ljubljana, Slovenia, Jan. 12-16, 2009.
Alcatel-Lucent, ""Best Companion" reporting for improved single-cell MU-MIMO pairing", 3GPP TSG RAN WG1 #56 Meeting, Athens, Greece, Feb. 9-13, 2009.
Nokia Siemens Networks, "LTE-Advanced SU-MIMO UE Transmission in LTE Release 8 Network", 3GPP TSG RAN WG1 Meeting #57, San Francisco, USA, May 4-8, 2009.
3GPP TS 25.214 V8.5.0, 3rd Generation Partnership Project; Technical Specification Group Radio Access Network; Physical Layer Procedures (FDD) (Release 8), Sophia Antipolis, France, Mar. 2009.
IEEE Standard 802.16 for Local and metropolitan area networks, "Part 16: Air Interface for Fixed Broadband Wireless Access Systems", Revision of IEEE Standard 802.16—2001, IEEE Computer Society and IEE Microwave Theory and Techniques Society, USA, Oct. 1, 2004.
NTT DOCOMO et al., "Prioritized Deployment Scenarios for LTE-Advanced Studies", 3GPP TSG RAN WG4 Meeting # 50, Athens, Greece, Feb. 9-13, 2009.
Hanzo et al., "OFDM and MCCDMA for Broadband Multi-User Communications, WLANs and Broadcasting", Wiley-IEEE Press, chapter 14, pp. 485-548, Sep. 19, 2003.
China Mobile et al., "Framework for LTE PDSCH DRS Demodulation Requirements", 3GPP TSG RAN WG4 Meeting #49, Prague, Czech Republic, Nov. 10-14, 2008.
Qualcomm Europe, "Downlink RS Structure in Support of Higher-Order MIMO", 3GPP TSG RAN WG1 Meeting #57, San Francisco, USA, May 4-8, 2009.
"RAN1 Chairman Notes", 3GPP TSG RAN WG1 Meeting #55bis, Ljubljana, Slovenia, Jan. 12-16, 2009.
Marvell Semiconductor, "Number of Codewords for 8×8 SU-MIMO in LTE-A DL", 3GPP TSG RAN WG1 Meeting #55bis, Ljubljana, Slovenia, Jan. 12-16, 2009.
LG Electronics, "Consideration of DL-MIMO in LTE-Advanced", 3GPP TSG RAN WG1 Meeting #55, Prague, Czech Republic, Nov. 10-14, 2008.
3rd Generation Partnership Project; Technical Specification Group Radio Access Network; Further Advancements for E-UTRA Physical Layer Aspects (Release 9), 3GPP TS 36.814 V0.4.1 (Feb. 2009), Sophia Antipolis, France.
ETSI TS 136213, "LTE; Evolved Universal Terrestrial Radio Access (E-UTRA), Physical Layer Procedures", V10.2.0, Jun. 2011.
3rd Generation Partnership Project; Technical Specification Group Radio Access Network; Evolved Universal Terrestrial Radio Access (E-UTRA); Physical Channels and Modulation (Release 8), 3GPP TS 36.211 V8.4.0 (Sep. 2008), Sophia Antipolis, France.
Alcatel-Lucent, "CQI and CSI Feedback Compression", 3GPP TSG RAN WG1 #54bis, Prague, Czech Republic, Sep. 29-Oct. 3, 2008.
Huawei, "DL MIMO Codebook", 3GPP TSG RAN WG1 Meeting #56bis, Seoul, South Korea, Mar. 23-27, 2009.
Huawei, "Adaptive Codebook Designs for MU-MIMO", 3GPP TSG RAN WG1 Meeting #56bis, Seoul, South Korea, Mar. 23-27, 2009.
Motorola, "On UE Feedback to Support LTE-A MU-MIMO and CoMP Operations", TSG-RAN WG1 #56bis, Seoul, South Korea, Mar. 23-27, 2009.

(56) References Cited

OTHER PUBLICATIONS

Huawei, "Adaptive Codebook Designs for DL MIMO", 3GPP TSG RAN WG1 Meeting #57, San Francisco, CA USA, May 3-8, 2009.
Ericsson, "On CSI feedback for ITU Requirement Fulfilling CoMP Schemes", TSG-RAN WG1 #57, San Francisco, USA, May 4-8, 2009.
Motorola, "Spatial Correlation Feedback to Support LTE-A MU-MIMO and CoMP: System Operation and Performance Results", TSG-RAN WG1 #57, San Francisco, USA, May 4-8, 2009.
Xia et al., "Design and Analysis of Transmit—Beamforming based on Limited-Rate Feedback", IEEE Transactions on signal processing (Draft), Minneapolis, MN, Mar. 16, 2005.
Huawei, "The Impact of CA on Mobility in LTE-A", 3GPP TSG RAN WG1 Meeting #56, Athens, Greece, Feb. 9-13, 2009.
U.S. Appl. No. 61/111,475, filed Nov. 5, 2008.
Research in Motion, UK Limited, "Uplink Power Control for Carrier Aggregation", 3GPP TSG RAN WG1 Meeting # 57b, Lon Angeles, USA, Jun. 29-Jul. 3, 2009.
Nokia Siemens Networks, "PUSCH Power Control for LTE-Advanced", 3GPP TSG RAN WG1 Meeting # 57bis, Los Angeles, USA, Jun. 29-Jul. 3, 2009.
3rd Generation Partnership Project; Technical Specification Group Radio Access Network; Radio Frequency (RF) System Scenarios (Release 5), 3GPP TR 25.942 V5.3.0, Sophia Antipolis, France, Jun. 2004.
Nokia Siemens Networks, "Autonomous Component Carrier Selection for LTE Advanced", 3GPP TSG RAN WG1 Meeting #54, Jeju Island, Korea, Aug. 18-22, 2008.
Nokia Siemens Networks, "Algorithms and Results for Autonomous Component Carrier Selection for LTE-Advanced", 3GPP TSG RAN WG1 Meeting #55, Prague, Czech Republic, Nov. 10-14, 2008.
Nokia Siemens Networks, "Use of Background Interference Matrix for Autonomous Component Carrier Selection for LTE-Advanced", 3GPP TSG RAN WG1 Meeting #55-bis, Ljubljana, Slovenia, Jan. 12-16, 2009.
Qualcomm Europe, Notion of Anchor Carrier in LTE-A', 3GPP TSG RAN WG1 Meeting #55-bis, Ljubljana, Slovenia, Jan. 12-16, 2009.
Samsung, "UL Transmission Power Control in LTE-A", 3GPP TSG RAN WG1 Meeting #56bis, Seoul, Korea, Mar. 23-27, 2009.
International Application PCT/IB2010/055763 Search Report dated Jun. 14, 2011.
International Application PCT/IB2011/050015 Search Report dated Jul. 5, 2011.
Marvell, "Downlink MIMO with Coordinated Beamforming and Scheduling", 3GPP TSG RAN WG1 59, Jeju, South Korea, Nov. 9-14, 2009.
Texas Instruments, "Views and Simulation Results on 4Tx Codebook Enhancement", 3GPP TSG RAN WG1 62, Madrid, Spain, Aug. 23-27, 2010.
Texas Instruments, "Higher CSI feedback accuracy for 4/8Tx Rel.10 DL MIMO", 3GPP TSG RAN WG1 62, Madrid, Spain, Aug. 23-27, 2010.
Japanese Patent Application # 2011-544111 Office Action dated Mar. 12, 2013.
U.S. Appl. No. 12/253,078, Office Action dated May 23, 2013.
ZTE, "Link Analysis of 4Tx Codebook Design for DL SL-MIMO", 3GPP TSG-RAN WG1 #48bis, St. Julians, Malta, Mar. 26-30, 2007.
Asahi, H., "A Function Generator for Walsh Order Hadamard Matrix and Fast Walsh-Hadamard Transform", Geoinformatics, vol. 11, No. 1, pp. 3-9, year 2000.
U.S. Appl. No. 12/965,878 Official Action dated Apr. 1, 2013.
U.S. Appl. No. 13/023,555 Office Action dated Feb. 5, 2013.
International Application PCT/IB2012/056181 Search Report dated Mar. 4, 2013.
International Application PCT/IB2012/056289 Search Report dated Mar. 26, 2013.
International Application PCT/IB2012/056182 Search Report dated Feb. 26, 2013.
Japanese Patent Application # 2011024295 Office Action dated Jan. 15, 2013.
JP Patent Application # 2011-551560 Office Action dated Oct. 29, 2013.
JP Patent Application # 2012-506601 Office Action dated Oct. 22, 2013.
U.S. Appl. No. 12/902,168 Office Action dated Aug. 5, 2013.
U.S. Appl. No. 12/983,898 Office Action dated Sep. 12, 2013.
U.S. Appl. No. 13/052,075 Office Action dated Jul. 15, 2013.
U.S. Appl. No. 13/766,790 Office Action dated Jul. 22, 2013.
U.S. Appl. No. 12/903,237 Office Action dated Aug. 16, 2013.
International Application PCT/IB2013/052963 Search Report dated Sep. 27, 2013.
U.S. Appl. No. 12/965,878 Office Action dated Oct. 24, 2013.
U.S. Appl. No. 13/052,075 Notice of Allowance dated Nov. 8, 2013.
U.S. Appl. No. 12/965,878 Notice of Allowance dated Feb. 10, 2014.
U.S. Appl. No. 13/543,835 Office Action dated Nov. 22, 2013.
U.S. Appl. No. 13/669,476 Office Action dated Mar. 31, 2014.
U.S. Appl. No. 14/179,593 Office Action dated Apr. 9, 2014.
U.S. Appl. No. 12/903,237 Office Action dated Feb. 27, 2014.
JP Application # 2012537460 Office Action dated Jan. 21, 2014.
NTT DoCoMo, 3GPP TSG RAN WG1, "Views on Scalable CSI Feedback for DL CoMP in LTE-Advanced", Meeting #58bis, R1-094243, pp. 1-5, Oct. 12-16, 2009.
NTT DoCoMo, 3GPP TSG RAN WG1, "Views on Single-Cell CSI Feedback Enhancement for DL MU-MIMO in LTE-Advanced", Meeting #58bis, R1-094241, pp. 1-6, Oct. 12-16, 2009.
U.S. Appl. No. 13/669,477 Official Action dated Apr. 14, 2014.

* cited by examiner

CODEBOOK SUBSAMPLING FOR PUCCH FEEDBACK

CROSS-REFERENCE TO RELATED APPLICATIONS

This application claims the benefit of U.S. Provisional Patent Application 61/390,511, filed Oct. 6, 2010, and U.S. Provisional Patent Application 61/392,431, filed Oct. 12, 2010, whose disclosures are incorporated herein by reference.

FIELD OF THE DISCLOSURE

The present invention relates generally to communication systems, and particularly to methods and systems for providing channel feedback in wireless communication systems.

BACKGROUND

In some communication systems, a mobile communication terminal receives downlink signals from a base station over a communication channel, and sends feedback indicative of the communication channel to the base station. The base station configures subsequent transmissions based on the feedback. Channel feedback of this sort is used, for example, in Evolved Universal Terrestrial Radio Access (E-UTRA) systems specified by the 3$^{rd}$ Generation Partnership Project (3GPP). These systems are also referred to as Long Term Evolution (LTE) and LTE Advanced (LTE-A).

Channel feedback schemes for LTE and LTE-A systems are discussed, for example, in 3GPP Technical Specification Group Radio Access Network Working Group 1 (TSG-RAN WG1) document R1-104473, entitled "Way Forward on 8Tx Codebook for Rel. 10 DL MIMO," Madrid, Spain, Aug. 23-27, 2010; in 3GPP TSG-RAN WG1 document R1-105067, entitled "Way Forward on CSI Feedback for Rel. 10 DL MIMO," Madrid, Spain, Aug. 23-27, 2010; in 3GPP TSG-RAN WG1 document R1-103839, entitled "Design and Evaluation of Precoder Codebooks for CSI Feedback," Dresden, Germany, Jun. 28-Jul. 2, 2010; and in 3GPP TSG-RAN WG1 document R1-104353, entitled "Two-Component PMI Codebook for 8TX," Madrid, Spain, Aug. 23-27, 2010, which are all incorporated herein by reference.

The description above is presented as a general overview of related art in this field and should not be construed as an admission that any of the information it contains constitutes prior art against the present patent application.

SUMMARY

An embodiment that is described herein provides a method in a mobile communication terminal. The method includes holding a definition of a sub-sampled codebook identifying precoding matrices to be used for providing precoding feedback by the terminal The precoding matrices in the sub-sampled codebook are selected from a master codebook that is made-up of a long-term sub-codebook and a short-term sub-codebook. The definition defines a first subset of the long-term sub-codebook and a second subset of the short-term sub-codebook. A Multiple-Input Multiple-Output (MIMO) signal is received in the terminal via multiple receive antennas. Based on the received MIMO signal, a precoding matrix is selected from the sub-sampled codebook for precoding subsequent MIMO signals transmitted to the terminal. The precoding feedback indicating the selected precoding matrix is calculated.

In some embodiments, the method includes transmitting the precoding feedback from the terminal. In a disclosed embodiment, transmitting the precoding feedback includes sending the precoding feedback over a Physical Uplink Control Channel (PUCCH). In an embodiment, sending the precoding feedback includes formatting the precoding feedback using a number of bits that is less than a total number of bits allocated to the precoding feedback in the PUCCH.

In an embodiment, the long-term sub-codebook and the short-term sub-codebook are each formed of sixteen precoding matrices having first indices {0 ... 15} and second indices {0 ... 15}, respectively, the first subset is formed of eight precoding matrices having the first indices {0,2,4,6,8,10,12,14} in the long-term sub-codebook, and the second subset is formed of two precoding matrices having the second indices {0,2} or four precoding matrices having the second indices {0,1,2,3}. In another embodiment, the long-term sub-codebook and the short-term sub-codebook are each formed of sixteen precoding matrices having first indices {0 ... 15} and second indices {0 ... 15}, respectively, the first subset is formed of eight precoding matrices having the first indices {0,2,4,6,8,10,12,14} in the long-term sub-codebook, and the second subset is formed of two precoding matrices having the second indices {0,1}.

In yet another embodiment, the long-term sub-codebook and the short-term sub-codebook are each formed of sixteen precoding matrices having first indices {0 ... 15} and second indices {0 ... 15}, respectively, the first subset is formed of eight precoding matrices having the first indices {0,2,4,6,8,10,12,14} in the long-term sub-codebook, and the second subset is formed of four precoding matrices having the second indices {0,2,8,10}. In still another embodiment, both the long-term sub-codebook and the first subset are formed of sixteen precoding matrices having first indices {0 ... 15}, both the short-term sub-codebook and the second subset are formed of sixteen precoding matrices having second indices {0 ... 15}, and selecting the precoding matrix includes selecting from the first subset a first precoding matrix, and selecting from the second subset a second precoding matrix whose second index is a modulo 2 or modulo 4 of a first index of the first precoding matrix.

In an embodiment, the method includes transmitting the precoding feedback and indicating in the precoding feedback only the first index and not the second index. In a disclosed embodiment, calculating the precoding feedback includes choosing one of the precoding matrices from the first subset and combining an indication of the chosen precoding matrix with a Rank Indication (RI) to produce four or five bits of the precoding feedback. In an embodiment, the combined indication of the chosen precoding matrix and the RI includes five bits, the long-term sub-codebook is formed of sixteen precoding matrices having indices {0 ... 15}, and choosing the precoding matrix includes choosing the matrix from among the precoding matrices having the indices {0,2,4,6,8,10,12,14}. In an embodiment, selecting the precoding matrix includes selecting a respective first precoding matrix from the first subset of the long-term sub-codebook, and selecting a respective second precoding matrix from the second subset of the short-term sub-codebook.

There is additionally provided, in accordance with an embodiment that is described herein, apparatus including a memory, a receiver and processing circuitry. The memory is configured to hold a definition of a sub-sampled codebook identifying precoding matrices to be used for providing precoding feedback by the terminal The precoding matrices in the sub-sampled codebook are selected from a master codebook that is made-up of a long-term sub-codebook and a short-term sub-codebook, and the definition defines a first subset of the long-term sub-codebook and a second subset of the short-term sub-codebook. The receiver is configured to receive a Multiple-Input Multiple-Output (MIMO) signal via multiple receive antennas. The processing circuitry is configured to select from the sub-sampled codebook a precoding matrix for precoding subsequent MIMO signals, and to calculate the precoding feedback indicating the selected precoding matrix.

In some embodiments, a mobile communication terminal includes the disclosed apparatus. In some embodiments, a chipset for processing signals in a mobile communication terminal includes the disclosed apparatus.

The present disclosure will be more fully understood from the following detailed description of the embodiments thereof, taken together with the drawings in which:

DETAILED DESCRIPTION OF EMBODIMENTS

Figure 1:
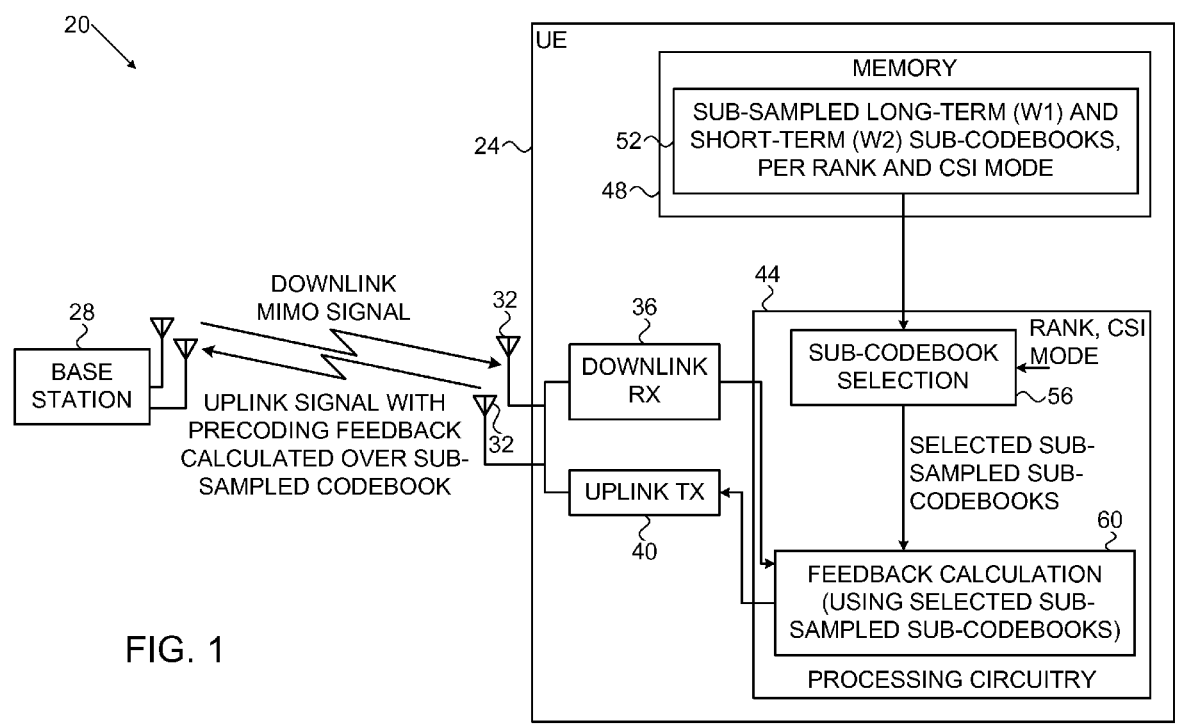
FIG. 1 is a block diagram that schematically illustrates a communication system, in accordance with an embodiment that is described herein.

Embodiments that are described herein provide improved channel feedback schemes for use in LTE, LTE-A and any other suitable mobile wireless communication networks. In some embodiments, a mobile communication terminal (referred to as a User Equipment—UE) receives a downlink Multiple-Input Multiple Output (MIMO) signal from a base station. The received downlink signal is typically precoded with a certain precoding scheme—A set of weights that are applied to the base station antennas. Each precoding scheme is typically represented by a precoding matrix. Based on the received downlink signal, the UE calculates precoding feedback that is indicative of the precoding matrix preferred by the UE for precoding subsequent transmissions by the base station. The UE then transmits the precoding feedback to the base station.

In an embodiment, the UE selects the preferred precoding matrix from a codebook that is agreed upon between the UE and the base station, and the precoding feedback indicates the index of the selected precoding matrix in the codebook. This sort of feedback is sometimes referred to as Precoding Matrix Indication (PMI). In LTE Release 10, for example, a codebook for the case of eight base station antennas (8TX) is defined in 3GPP TSG-RAN WG1 document R1-104473, cited above. Typically, the codebook is defined per rank, i.e., per each number of simultaneous data streams (also referred to as spatial streams or spatial layers) that are transmitted from the base station to the UE in the downlink MIMO signal.

In some embodiments, the UE transmits the precoding feedback to the base station, possibly along with other types of feedback, over a Physical Uplink Control Channel (PUCCH). The PUCCH has only a limited number of bits for allocating to feedback information. Therefore, in the disclosed embodiments, the UE uses a sub-sampled codebook that is selected from a certain master codebook in order to reduce the feedback bandwidth. The disclosed embodiments provide several examples of sub-sampled codebooks for use over the PUCCH in various operational modes.

In some embodiments, the master codebook is made-up of a combination of a long-term sub-codebook denoted W1 and a short-term sub-codebook denoted W2, and each precoding scheme comprises a combination of a precoding matrix selected from the long-term sub-codebook and a precoding matrix selected from the short-term sub-codebook. Generally, the long-term sub-codebook typically represents the component of the precoding operation that changes relatively slowly, and the short-term sub-codebook represents the component of the precoding operation that changes more quickly. In these embodiments, each sub-sampled codebook is defined as a combination of a subset of the long-term sub-codebook and a subset of the short-term sub-codebook.

In some embodiments, the UE is configured to provide the precoding feedback in one of several predefined Channel State Information (CSI) modes. In a disclosed embodiment, the UE holds multiple sub-sampled codebooks corresponding to various ranks and CSI modes. The UE calculates the precoding feedback by first selecting the appropriate sub-sampled codebook for the applicable rank and CSI mode, and then chooses the preferred precoding matrix from the selected sub-sampled codebook. Several examples of sub-sampled codebooks for various ranks and CSI modes are described in detail below.

The methods and systems described herein optimize the sub-sampling of the master codebook, so as to provide accurate precoding feedback using the limited bandwidth resources of the PUCCH. By providing accurate precoding feedback, the disclosed techniques enable the base station to increase the downlink throughput.

FIG. 1 is a block diagram that schematically illustrates a communication system 20, in accordance with an embodiment that is described herein. System 20 comprises a mobile communication terminal 24, also referred to as a User Equipment (UE). The UE may comprise, for example, a cellular phone, a wireless-enabled mobile computer, or any other suitable type of terminal having communication capabilities. UE 24 communicates with a base station (BS) 28, also referred to as an eNodeB.

In the embodiments described herein, system 20 operates in accordance with the LTE-A specifications. Alternatively, however, system 20 may operate in accordance with any other suitable communication protocol.

The example of FIG. 1 shows only a single BS and a single UE for the sake of clarity. Real-life systems, however, typically comprise multiple BSs and UEs.

UE 24 comprises one or more antennas 32 for receiving downlink MIMO signals from BS 28 and for transmitting uplink signals to the BS. A downlink receiver (RX) 36 receives the downlink signals and an uplink transmitter (TX) 40 transmits the uplink signals. UE 24 further comprises processing circuitry 44 and a memory 48. Memory 48 holds a definition of sub-sampled long-term and short-term sub-codebooks, a respective pair of sub-sampled long- and short-term sub-codebooks per each rank and CSI mode supported by the UE. In a given pair, the long-term sub-codebook is formed of a subset of the precoding matrices in the long-term sub-codebook of the master codebook. The short-term sub-codebook in the given pair is formed of a subset of the precoding matrices in the short-term sub-codebook of the master codebook. Both subsets of precoding matrices are typically defined in advance, e.g., by simulation, so as to provide optimal precoding accuracy for the given rank and CSI mode.

In the embodiment seen in FIG. 1, processing circuitry 44 comprises a sub-code selection unit 56, which selects the appropriate pair of sub-sampled sub-codebooks for the applicable rank and CSI mode. A feedback calculation unit 60 chooses a preferred precoding scheme based on the received downlink MIMO signal. Unit 60 chooses the precoding scheme from within the pair of sub-sampled sub-codebooks selected by unit 56. The preferred precoding scheme comprises a precoding matrix from the subset of long-term precoding matrices in that pair, and a precoding matrix from the subset of short-term precoding matrices in that pair.

Feedback calculation unit 60 formats precoding feedback that is indicative of the preferred precoding scheme. The precoding feedback uses some or all of the available bits in the PUCCH. Unit 60 provides the precoding feedback to uplink transmitter 40, which transmits the precoding feedback to BS 28 over the PUCCH. BS 28 typically decodes the precoding feedback from the PUCCH and uses the feedback in deciding on the precoding of subsequent downlink transmissions.

The UE configuration shown in FIG. 1 is an example configuration, which is depicted solely for the sake of clarity. In alternative embodiments, any other suitable UE configuration can be used. UE elements that are not mandatory for understanding of the disclosed techniques have been omitted from the figure for the sake of clarity.

In various embodiments, some or all of the elements of UE 24, including downlink receiver 36, uplink transmitter 40, processing circuitry 44 and/or memory 48, are implemented in hardware, such as using one or more Radio Frequency Integrated Circuits (RFICs), Field-Programmable Gate Arrays (FPGAs) or Application-Specific Integrated Circuits (ASICs). Memory 48 comprises any suitable type of memory device, for example Random Access Memory (RAM) or non-volatile memory such as Flash memory. In alternative embodiments, certain UE elements are implemented in software, or using a combination of hardware and software elements. In some embodiments, some or all of the elements of UE 24, including receiver 36, transmitter 40, processing circuitry 44 and/or memory 48, are implemented in a signal processing chip-set for use in mobile communication terminals.

In some embodiments, certain UE elements, such as certain elements of processing circuitry 44, are implemented in a programmable processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

In some embodiments, the master codebook from which the various sub-sampled sub-codebooks are derived is the 8TX codebook defined in 3GPP TSG-RAN WG1 document R1-104473, cited above. This master codebook assigns the following number of bits for long-term (W1) and short-term (W2) precoding feedback, depending on rank:

TABLE 1

Allocation of W1 and W2 precoding feedback bits

| Rank | (W1, W2) bits |
|---|---|
| 1 | (4, 4) |
| 2 | (4, 4) |
| 3 | (2, 4) |
| 4 | (2, 3) |
| 5 | (2, 0) |
| 6 | (2, 0) |
| 7 | (2, 0) |
| 8 | (0, 0) |

In some embodiments, UE 24 reports the precoding feedback over the PUCCH in one of two predefined reporting modes, also referred to as CSI modes. The two modes are denoted "CSI 1" and "CSI 2". These modes are defined in 3GPP TSG-RAN WG1 document R1-105067, cited above. In each reporting mode, the UE reports the W1 and W2 bits, as well as a Rank Indication (RI) and a Channel Quality Indication (CQI). The feedback is reported in two successive uplink sub-frames denoted "report 1" and "report 2", according to the following table:

TABLE 2

PUCCH CSI reporting modes

| PUCCH CSI reporting mode | Report 1 | Report 2 |
|---|---|---|
| CSI mode 1 | RI, W1 | CQI, W2 |
| CSI mode 2 | RI | CQI, W1, W2 |

In order to fit the limited bandwidth resources of the PUCCH, UE 24 typically uses reduced-size, or sub-sampled, sub-codebooks in both reporting modes. In CSI mode 1, for example, Report 1 is typically the bottleneck since the long-term feedback (W1) should be robust to errors. In CSI mode 2, as another example, only eleven bits are available for precoding feedback. Thus, in CSI mode 1 the long-term (W1) sub-codebook should be sub-sampled, and in CSI mode 2 both the W1 and W2 sub-codebooks should be sub-sampled. Several examples of such sub-sampled sub-codebooks are described below. Simulation results related to these techniques are given in U.S. Provisional Patent Applications 61/390,511 and 61/392,431, cited above, and in 3GPP TSG-RAN WG1 document R1-105885, entitled "Details of PUCCH 1-1 for 8TX," Jacksonville, Fla., Nov. 15-19, 2010, which is incorporated herein by reference in its entirety.

In some embodiments, the codebook sub-sampling is related to possible implementations of the base station antennas. In some base stations, the transmit antennas used for transmitting the downlink MIMO signals are arranged in a linear array of co-polarized antennas having uniform spacing. This kind of array is denoted OLA. In other base stations, the transmit antennas are arranged in two linear arrays of co-polarized antennas, such that the two arrays have a 90-degree polarization relative to one another. This kind of array is denoted X-POL.

The bits assigned for precoding feedback can be divided into bits that indicate the direction of the transmission beam (these bits are denoted Discrete Fourier Transform (DFT) bits) and bits that indicate the relative phase between the two X-POL antenna arrays (these bits are denoted X-POL bits). Generally speaking, the beam direction varies relatively slowly, while the relative phase between the X-POL antenna arrays varies more rapidly. Thus, the DFT bits are sometimes associated with the long-term (W1) feedback and the X-POL bits are sometimes associated with the short-term (W2) feedback. This heuristic relationship, although not exact, can be used for finding efficient sub-sampling of the long- and short-term sub-codebooks.

In an embodiment, for rank 1, the master codebook (denoted W) can be parameterized according to the two above-described parameters—beam angle (DFT angle) and relative X-POL phase. The sub-sampling problem thus translates to the problem of assigning the optimal number of DFT bits and X-POL bits. This sort of optimal bit allocation can be found, for example, by simulation.

In an embodiment, for the case of rank 2, in addition to the DFT angle and the relative X-POL phase, it is possible to parameterize the master codebook W according to the difference in DFT angle between the two columns of the base station precoder. In an embodiment, for a master codebook in which the DFT angle is indexed between 0 and 31, the DFT angle offset between precoder columns ranges from 0 to 3.

In some embodiments, the W1 codebook is common to both rank 1 and rank 2, and therefore the sub-sampled codebook is elected to have a common W1 sub-codebook for rank 1 and rank 2, as well. Based on these guidelines and constraints, example sub-sampled long-term (W1) and short-term (W2) sub-codebooks for rank 1 and rank 2 in CSI mode 2 are given in the following table:

TABLE 3

Example codebook sub-sampling

|  | W1 sub-codebook for ranks 1 and 2 | W2 sub-codebook for rank 1 | W2 sub-codebook for rank 2 |
| --- | --- | --- | --- |
| Embodiment I | 3 bits, $i_1$ drawn from $\{0, 2, 4, \ldots, 14\}$ | 1 bit, $i_2$ drawn from $\{0, 2\}$ OR 2 bits, $i_2$ drawn from $\{0, 1, 2, 3\}$ | 1 bit, $i_2$ drawn from $\{0, 1\}$ |
| Embodiment II | 3 bits, $i_1$ drawn from $\{0, 2, 4, \ldots, 14\}$ | 2 bits, $i_2$ drawn from $\{0, 2, 8, 10\}$ | 1 bit, $i_2$ drawn from $\{0, 1\}$ |
| Embodiment III | 4 bits, $i_1$ drawn from $\{0, 1, 2, \ldots, 15\}$ | 0 bits, $i_2 = i_1 \bmod 4$ | 0 bits, $i_2 = i_1 \bmod 2$ |

In the above examples, the master codebook W is formed from a long-term sub-codebook and a short-term sub-codebook, each having sixteen precoding matrices indexed $\{0,1,\ldots,15\}$. The notation and indexing of the precoding matrices is in accordance with the definitions given in 3GPP Technical Specification TS 36.213, entitled "LTE; Evolved Universal Terrestrial Radio Access (E-UTRA); Physical Layer Procedures," version 10.2.0, Release 10, July, 2011, which is incorporated herein by reference.

In the examples of Table 3, $i_1$ denotes the indices of the precoding matrices that are included in the sub-sampled long-term sub-codebook, and $i_2$ denotes the indices of the precoding matrices that are included in the sub-sampled short-term sub-codebook. Note that in Embodiment III, no short-term precoding feedback is sent at all. In this embodiment, the short-term precoding feedback ($i_2$) is deduced by the base station from the long-term precoding feedback ($i_1$) using a modulo operation. Note also that Embodiment I and Embodiment II satisfy the nesting property, i.e., the columns of higher rank precoders are part of the lower rank precoders. For example, the columns of all the rank-2 precoders belong to the rank-1 codebook.

In some embodiments, the PUCCH has a certain number of bits available for allocation to precoding feedback, but UE 24 uses less than the available number of bits for formatting the feedback. In one example embodiment, the PUCCH has a total of eleven bits available for CSI feedback. For rank 1, four bits are used for CQI feedback, leaving seven bits for precoding feedback. In one embodiment, Feedback calculation unit 60 uses only four of the seven bits for formatting the precoding feedback (and the sub-sampled sub-codebooks are defied accordingly).

The reason for not using all of the available bits is that the probability of error in decoding the feedback at the base station grows with the actual number of bits being used. For example, the probability of errors when decoding seven bits is higher than when decoding four bits. In some practical cases, the resulting downlink throughput for seven and four bits of precoding feedback is similar. In such cases, it is preferable for UE 24 to use a smaller number of feedback bits in order to reduce the error probability.

In an embodiment, in CSI mode 2, the sub-sampled sub-codebook for rank 1 is represented using four or five bits. For four-bit sub-sampling, the sub-sampled sub-codebook is formed of the following three-bit long-term (W1) sub-codebook and a one-bit short-term (W2) sub-codebook:

$$C_1 = \{W_1^{(0)}, W_1^{(2)}, W_1^{(4)}, \ldots, W_1^{(14)},\} \quad \text{Equation 1}$$

$$W_2 \in C_2 = \left\{ \frac{1}{\sqrt{2}} \begin{bmatrix} Y \\ Y \end{bmatrix}, \frac{1}{\sqrt{2}} \begin{bmatrix} Y \\ -Y \end{bmatrix} \right\}$$

$$Y = \tilde{e}_1$$

For five-bit sub-sampling, the sub-sampled sub-codebook is give by:

$$W_2 \in C_2 = \left\{ \frac{1}{\sqrt{2}} \begin{bmatrix} Y \\ Y \end{bmatrix}, \frac{1}{\sqrt{2}} \begin{bmatrix} Y \\ -Y \end{bmatrix} \right\} \quad \text{Equation 2}$$

$$Y = \{\tilde{e}_1, \tilde{e}_3\}$$

Equations 1 and 2 use the notation of TSG-RAN WG1 document R1-104473, cited above, wherein $C_1$ denotes the long-term sub-sampled sub-codebook. Vectors $\tilde{e}_1$ and $\tilde{e}_3$ denote column selectors that select the first and third columns, respectively, of a matrix left-multiplied by them. For example, $A\tilde{e}_3$, produces the third column of matrix A.

For the case of no feedback errors, the sub-sampled codebook typically uses all seven available bits. The long-term sub-sampled sub-codebook in this embodiment is:

$$C_1 = \{W_1^{(0)}, W_1^{(2)}, W_1^{(4)}, \ldots, W_1^{(14)}\} \quad \text{Equation 3:}$$

and the short-term sub-sampled sub-codebook is the original short-term sub-codebook.

In an embodiment, in CSI mode 2 rank 2, the sub-sampled sub-codebooks are given by:

$$C_1 = \{W_1^{(0)}, W_1^{(2)}, W_1^{(4)}, \ldots, W_1^{(14)}\} \quad \text{Equation 4}$$

$$W_2 \in C_2 = \left\{ \frac{1}{\sqrt{2}} \begin{bmatrix} Y \\ Y \end{bmatrix}, \frac{1}{\sqrt{2}} \begin{bmatrix} Y \\ jY \end{bmatrix}, \frac{1}{\sqrt{2}} \begin{bmatrix} Y \\ -Y \end{bmatrix}, \frac{1}{\sqrt{2}} \begin{bmatrix} Y \\ -jY \end{bmatrix} \right\}$$

$$Y = \{\tilde{e}_1, \tilde{e}_3\}$$

In an embodiment, for rank 2, the sub-sampled sub-codebook is selected to have a total of four bits, three of which comprise DFT bits and one bit comprises an X-POL bit, and an offset of 1 between the precoder columns In this embodiment, the sub-sampled sub-codebooks are given by:

$$C_1 = \{W_1^{(0)}, W_1^{(2)}, W_1^{(4)}, \ldots, W_1^{(14)}\} \quad \text{Equation 5}$$

$$W_2 \in C_2 = \left\{ \frac{1}{2}\begin{bmatrix} Y_1 & Y_2 \\ Y_1 & -Y_2 \end{bmatrix}, \frac{1}{2}\begin{bmatrix} Y_1 & Y_2 \\ jY_1 & -jY_2 \end{bmatrix} \right\}$$

$$Y_1 = \tilde{e}_1, Y_2 = \tilde{e}_3$$

The examples above refer to CSI mode 2 reporting. The following description refers to CSI mode 1 reporting. In CSI mode 1, the RI bits are encoded together with the W1 bits in the same sub-frame. In some embodiments, the UE defines the size of the sub-sampled long-term (W1) sub-codebook depending on the rank. For a given size, the long-term sub-codebook of the master codebook is typically sampled uniformly to produce the sub-sampled long-term sub-codebook.

In some embodiments, for a UE that is configured to provide feedback for up to rank 8, the size of the sub-sampled W1 sub-codebook (i.e., the number of W1 precoding matrices in the sub-sampled sub-codebook) for CSI mode 1 is given by:

TABLE 4

Allocation of W1 sub-codebook in CSI mode 1

| Rank | Original (W1, W2) bits in master codebook | Number of W1 matrices, assuming a total of 5 bits for RI + W1 | Number of W1 matrices, assuming a total of 4 bits for RI + W1 |
|---|---|---|---|
| 1 | (4, 4) | 8 | 4 |
| 2 | (4, 4) | 8 | 4 |
| 3 | (3, 4) | 4 | 2 |
| 4 | (3, 3) | 4 | 2 |
| 5 | (2, 0) | 2 | 1 |
| 6 | (2, 0) | 2 | 1 |
| 7 | (2, 0) | 2 | 1 |
| 8 | (1, 0) | 1 | 1 |

The table gives the W1 sub-codebook size for two assumptions: A total of five bits allocated to the combined RI and W1 report, and a total of four bits allocated to the combined RI and W1 report. The error probability for four bits is lower than the error probability of five bits.

The total number of bits for the combined RI and W1 report, in accordance with an embodiment, is given in the following table as a function of the number of UE receive antennas 32:

TABLE 5

Total number of RI + W1 bits

| Number of UE receive antennas | Total number of RI + W1 bits |
|---|---|
| Embodiment A: | |
| 2 | 4 |
| 4 | 5 |
| 8 | 5 |
| Embodiment B: | |
| 2 | 3 |
| 4 | 4 |
| 8 | 4 |

In the above-described embodiments, either two or three bits of W1 can be combined with RI for rank 1. Example simulation results for these numbers of bits, and considering possible effects on error probability, are given in U.S. Provisional Patent Applications 61/390,511 and 61/392,431, cited above, and in 3GPP TSG-RAN WG1 document R1-105885, cited above. Various uplink error models can be used for this purpose. The simulation results use a model that is described in 3GPP TSG-RAN WG1 document R1-105886, cited above. These references are all incorporated herein by reference in their entirety.

Thus, in an embodiment, in CSI mode 1, the total allocation for RI+W1 is five bits according to the allocation given in Table 5 above. The W1 matrices are selected in these embodiments from the set of indices {0,2,4,6,8,10,12,14}.

Figure 2:
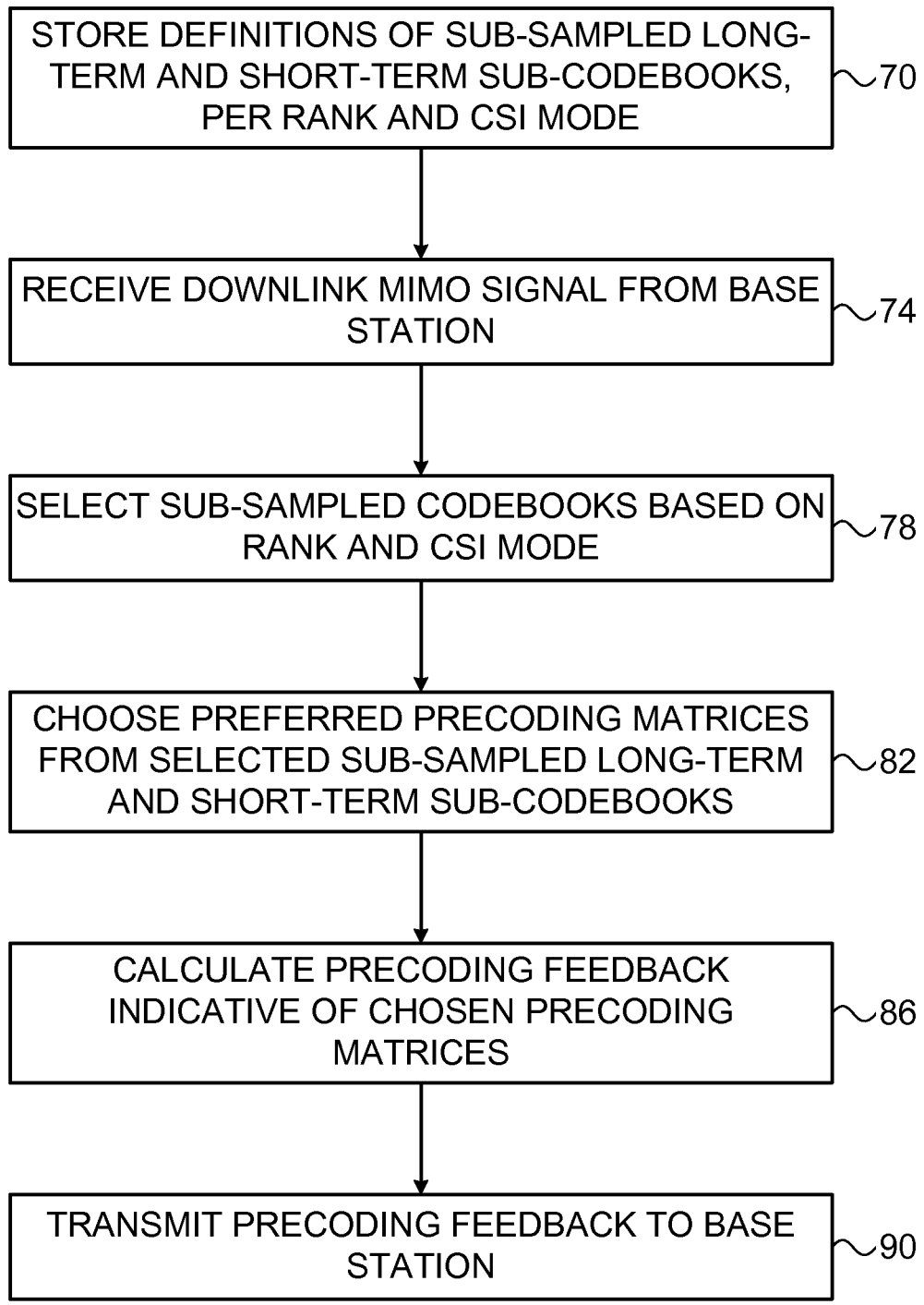
FIG. 2 is a flow chart that schematically illustrates a method for providing precoding feedback, in accordance with an embodiment that is described herein.

FIG. 2 is a flow chart that schematically illustrates a method for providing precoding feedback, in accordance with an embodiment that is described herein. The method begins with UE 24 storing in memory 52 a definition of long-term and short-term sub-codebooks, sub-sampled per rank and CSI mode, at an initialization operation 70. Any suitable sub-sampled codebooks, such as the codebooks described above, can be used.

Downlink receiver 36 receives a downlink MIMO signal from base station 28, at a reception operation 74. Sub-codebook selection unit 56 selects the appropriate sub-sampled sub-codebooks for the applicable rank and CSI mode, at a sub-codebook selection operation 78.

Based on the received downlink MIMO signal, feedback calculation unit 60 chooses a preferred pre-coding scheme from the sub-sampled codebook selected at operation 78 above. Typically, the selected sub-sampled codebook comprises a long-term sub-sampled sub-codebook and a short-term sub-sampled sub-codebook, and the chosen precoding scheme comprises a respective pair of precoding matrices, one from each sub-sampled sub-codebook.

Feedback calculation unit 60 calculates precoding feedback that is indicative of the chosen preferred precoding scheme, at a feedback calculation operation 86. Unit 60 provides the precoding feedback to uplink transmitter 40. The uplink transmitter transmits the precoding feedback to base station 28 over the PUCCH, at an uplink transmission operation 90. The base station typically configures (e.g., precodes) its subsequent downlink transmissions using the feedback.

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:

in a mobile communication terminal, holding a definition of a sub-sampled codebook identifying precoding matrices to be used for providing precoding feedback by the terminal, wherein the precoding matrices in the sub-sampled codebook are selected from a master codebook that is made-up of a first sub codebook and a second sub-codebook, wherein the first sub-codebook represents a first precoding component and the second sub-codebook represents a second precoding component that varies more rapidly than the first precoding component, and wherein the definition defines a first subset of the first sub-codebook and a second subset of the second sub-codebook;

receiving in the terminal a Multiple-Input Multiple-Output (MIMO) signal via multiple receive antennas; and based on the received MIMO signal, selecting from the sub-sampled codebook a precoding matrix for precoding subsequent MIMO signals transmitted to the terminal, and calculating the precoding feedback indicating the selected precoding matrix by choosing one of the precoding matrices from the first subset and combining an indication of the chosen precoding matrix with a Rank Indication (RI) to produce four or five bits of the precoding feedback, wherein the combined indication of the chosen precoding matrix and the RI comprises five bits, wherein the first sub-codebook is formed of sixteen precoding matrices having indices {0 . . . 15}, and wherein choosing the precoding matrix comprises choosing the matrix from among the precoding matrices having the indices {0,2,4,6,8,10,12,14}.

2. The method according to claim 1, comprising transmitting the precoding feedback from the terminal.

3. The method according to claim 1, wherein
transmitting the precoding feedback comprises sending the precoding feedback over a Physical Uplink Control Channel (PUCCH).

4. The method according to claim 3, wherein
sending the precoding feedback comprises formatting the precoding feedback using a number of bits that is less than a total number of bits allocated to the precoding feedback in the PUCCH.

5. The method according to claim 1,
wherein the first sub codebook and the second sub-codebook are each formed of sixteen precoding matrices having first indices {0 . . . 15} and second indices {0 . . . 15}, respectively, wherein the first subset is formed of eight precoding matrices having the first indices {0,2,4,6,8,10,12,14} in the first sub-codebook, and wherein the second subset is formed of two precoding matrices having the second indices {0,2} or four precoding matrices having the second indices {0,1,2,3}.

6. The method according to claim 1,
wherein the first sub-codebook and the second sub-codebook are each formed of sixteen precoding matrices having first indices {0. . . 15} and second indices {0 . . . 15}, respectively, wherein the first subset is formed of eight precoding matrices having the first indices {0,2,4,6,8,10,12,14} in the first sub-codebook, and wherein the second subset is formed of two precoding matrices having the second indices {0,1}.

7. The method according to claim 1, wherein the first sub codebook and the second sub-codebook are each formed of sixteen precoding matrices having first indices {0. . . 15} and second indices {0 . . . 15}, respectively, wherein the first subset is formed of eight precoding matrices having the first indices {0,2,4,6,8,10,12,14} in the first sub-codebook, and wherein the second subset is formed of four precoding matrices having the second indices {0,2,8,10}.

8. The method according to claim 1,
wherein both the first sub-codebook and the first subset are formed of sixteen precoding matrices having first indices {0 . . . 15}, wherein both the second sub-codebook and the second subset are formed of sixteen precoding matrices having second indices {0 . . . 15}, and wherein selecting the precoding matrix comprises selecting from the first subset a first precoding matrix, and selecting from the second subset a second precoding matrix whose second index is a modulo 2 or modulo 4 of a first index of the first precoding matrix.

9. The method according to claim 8,
comprising transmitting the precoding feedback and indicating in the precoding feedback only the first index and not the second index.

10. The method according to claim 1,
wherein selecting the precoding matrix comprises selecting a respective first precoding matrix from the first subset of the first sub-codebook, and selecting a respective second precoding matrix from the second subset of the second sub-codebook.

11. Apparatus, comprising:
a memory, which is configured to hold a definition of a sub-sampled codebook identifying precoding matrices to be used for providing precoding feedback by the terminal, wherein the precoding matrices in the sub-sampled codebook are selected from a master codebook that is made-up of a first sub-codebook and a second sub-codebook, wherein the first sub-codebook represents a first precoding component and the second sub-codebook represents a second precoding component that varies more rapidly than the first precoding component, and wherein the definition defines a first subset of the first sub-codebook and a second subset of the second sub-codebook;

a receiver, which is configured to receive a Multiple-Input Multiple-Output (MIMO) signal via multiple receive antennas; and processing circuitry, which is configured to select from the sub-sampled codebook a precoding matrix for precoding subsequent MIMO signals, and to calculate the precoding feedback indicating the selected precoding matrix by choosing one of the precoding matrices from the first subset and combining an indication of the chosen precoding matrix with a Rank Indication (RI) to produce four or five bits of the precoding feedback, wherein the combined indication of the chosen precoding matrix and the RI comprises five bits, wherein the first sub-codebook is formed of sixteen precoding matrices having indices {0 . . . 15}, and wherein choosing the precoding matrix comprises choosing the matrix from among the precoding matrices having the indices {0,2, 4,6,8,10,12,14}.

12. The apparatus according to claim 11, wherein the processing circuitry is configured to format the precoding feedback using a number of bits that is less than a total number of bits allocated to the precoding feedback.

13. The apparatus according to claim 11, wherein the first sub-codebook and the second sub-codebook are each formed of sixteen precoding matrices having first indices {0 . . . 15} and second indices {0 . . . 15}, respectively, wherein the first subset is formed of eight precoding matrices having the first indices {0,2,4,6,8,10,12,14} in the first sub-codebook, and wherein the second subset is formed of two precoding matrices having the second indices {0,2} or four precoding matrices having the second indices {0,1,2,3}.

14. The apparatus according to claim 11, wherein the first sub-codebook and the second sub-codebook are each formed of sixteen precoding matrices having first indices {0 . . . 15} and second indices {0 . . . 15}, respectively, wherein the first subset is formed of eight precoding matrices having the first indices {0,2,4,6,8,10,12,14} in the first sub-codebook, and wherein the second subset is formed of two precoding matrices having the second indices {0,1}.

15. The apparatus according to claim 11, wherein the first sub-codebook and the second sub-codebook are each formed of sixteen precoding matrices having first indices {0 ... 15} and second indices {0 ... 15}, respectively, wherein the first subset is formed of eight precoding matrices having the first indices {0,2,4,6,8,10,12,14} in the first sub-codebook, and wherein the second subset is formed of four precoding matrices having the second indices {0,2,8,10}.

16. The apparatus according to claim 11, wherein both the first sub-codebook and the first subset are formed of sixteen precoding matrices having first indices {...15}, wherein both the second sub-codebook and the second subset are formed of sixteen precoding matrices having second indices {0 ... 15}, and wherein the processing circuitry is configured to select from the first subset a first precoding matrix, and to select from the second subset a second precoding matrix whose second index is a modulo 2 or modulo 4 of a first index of the first precoding matrix.

17. The apparatus according to claim 11, wherein the 1 ng tcrm first sub-codebook is formed of sixteen precoding matrices having indices {0 ... 15}, and
wherein the processing circuitry is configured to choose one of the precoding matrices having the indices {0,2,4,6,8,10,12,14} from the first subset, and to combine an indication of the chosen precoding matrix with a Rank Indication (RI) to produce five bits of the precoding feedback.

18. A mobile communication terminal comprising the apparatus of claim 11.

19. A chipset for processing signals in a mobile communication terminal, comprising the apparatus of claim 11.

* * * * *